Dec. 24, 1935. CHU-PHAY YAP 2,025,488
X-RAY DIFFRACTION APPARATUS
Original Filed March 29, 1933 2 Sheets-Sheet 2
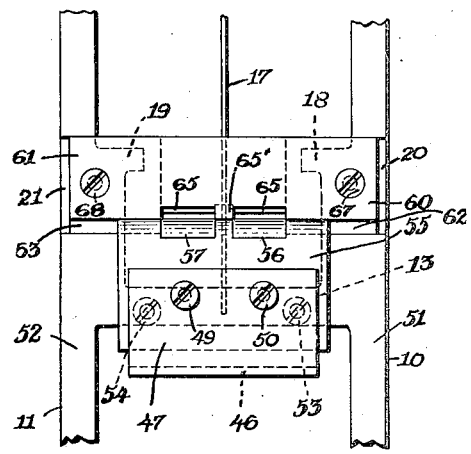
Fig. 4.
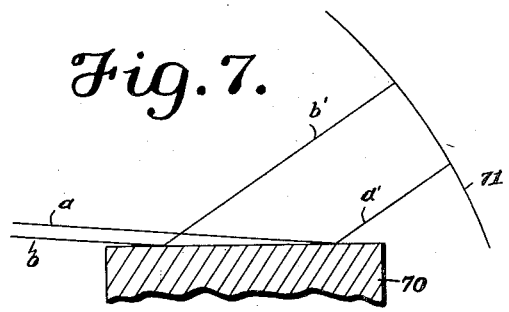
Fig. 7.
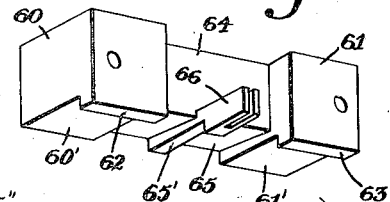
Fig. 5.
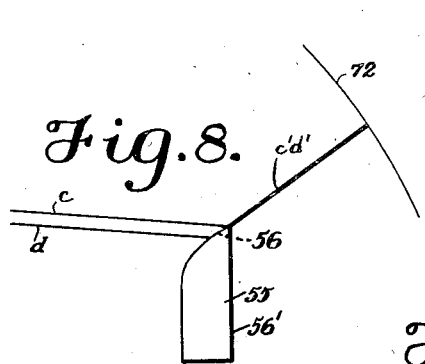
Fig. 8.
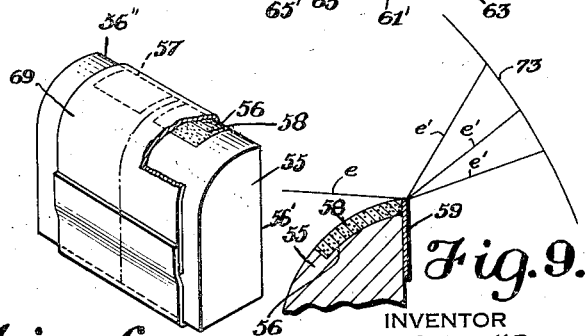
Fig. 6.
Fig. 9.
INVENTOR
CHU-PHAY YAP
BY
ATTORNEY Patented Dec. 24, 1935

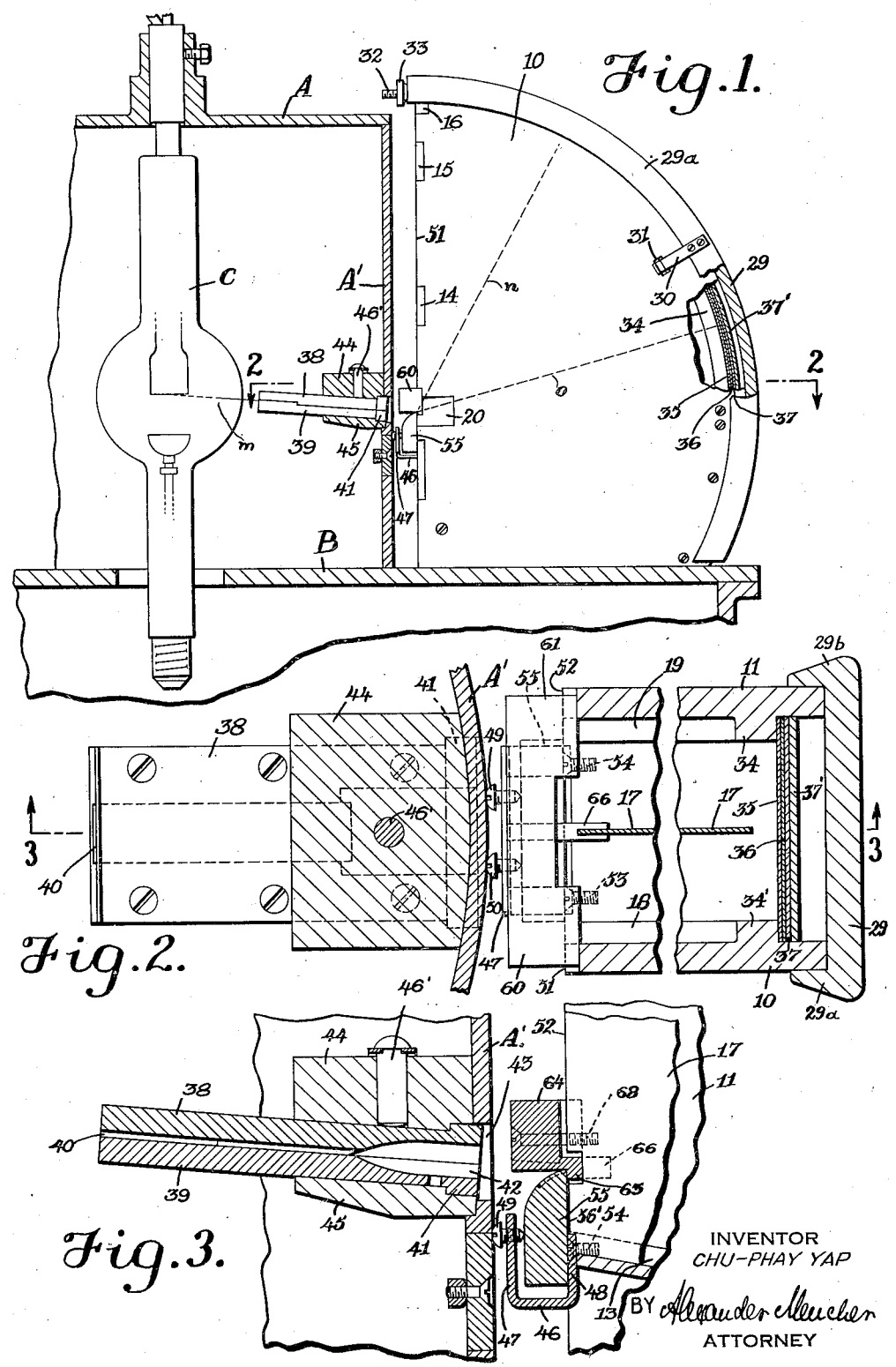

2,025,488

UNITED STATES PATENT OFFICE 2,025,488

X-RAY DIFFRACTION APPARATUS

Chu-Phay Yap, Nankin, China

Application March 29, 1933, Serial No. 663,258
Renewed May 3, 1935

8 Claims. (Cl. 250—34)

This invention relates generally to X-ray diffraction cameras, but more specifically to that type of camera utilizing quadrant cassettes and wherein the specimen of metal or alloy whose diffraction pattern is sought is packed into a glass capillary tube, the said glass capillary tube occupying the center of the cassette of definite radius.

The main object of the invention is to adapt the quadrant cassette type of X-ray diffraction camera by simple and slight modification and addition of cooperating structure such that said type of camera becomes capable of not only producing a diffraction pattern of powder, but also a diffraction pattern of solids, sheets and/or wires.

Another object of the invention in accordance with the above said adaptation of the quadrant cassette type of X-ray diffraction camera is provision of structure whereby a shorter exposure of film is necessary, such reduction in exposure being due partly to the invocation of a specific focussing principle.

A further object of the invention is provision of structure whereby diffraction patterns of solids, sheets, wires and powders are obtainable merely by interchangeability of the specimens.

A still further object of the invention is provision of structure whereby fogging of the film is reduced to a minimum.

These objects and other incidental ends and advantages inherent in the invention will hereinafter appear in the progress of the present disclosure.

Attached hereto and forming part hereof are drawings showing a preferred embodiment of the invention wherein like reference characters designate corresponding parts throughout the several views. These drawings primarily relate to a modification and improvement in the cassette of the quadrant type of diffraction apparatus heretofore mentioned. Such cassette of this type of apparatus is provided with a combination specimen holder and film holder and is capable of radial disposition with a plurality of other similar cassettes with respect to a cylindrical housing containing the source of X-rays.

The drawings are described as follows:

Figure 1 represents a view in elevation and partly broken away showing a preferred form of cassette embodying the invention herein, the said figure showing fragmentarily a section of the housing containing the source of X-rays and a cylinder containing the source of electrical energy.

Figure 2 is a view in section of Figure 1 along the line 2—2 thereof.

Figure 3 is a view in section along the line 3—3 of Figure 2.

Figure 4 is a front and fragmentary elevational view of the front face of a cassette of the above mentioned type showing the modification and improved structure thereon, the subject matter of the invention herein.

Figure 5 is a view in perspective of the baffle mechanism utilized in the invention.

Figure 6 is a view in perspective of a specimen holder utilized in the invention.

Figure 7 is a diagrammatic view showing diffraction of X-rays from a specimen having an exposed planar surface.

Figure 8 is a diagrammatic view showing diffraction of X-rays from a specimen having an exposed and curved surface, said diagram featuring a focussing principle utilized in the invention.

Figure 9 is a diagrammatic view showing diffraction of X-rays from a known and unknown specimen on the same film, the said known and unknown specimens being in a specimen holder which is part of the subject matter of the invention herein.

Before proceeding with a description of the preferred new and modified structure in accordance with the invention and in accordance with the accompanying drawings, it is well to outline briefly at this time the practice and shortcomings of the quadrant type of X-ray diffraction apparatus.

In the employment of X-ray diffraction apparatus utilizing the quadrant type of cassette as is used commercially today, diffraction patterns of metal and/or alloys are obtained from powders thereof. This is true of the diffraction apparatus embodying the structure of Hull, U. S. Patent No. 1,546,349. The powder is obtained by sieving the filings of a metal or alloy through a 200-mesh screen and mixing therewith starch in a proportion depending on the density of the powder. The powder is then packed into a glass capillary tube of about 0.6 mm. in internal diameter and 0.8 mm. in external diameter. In the customary type of cassette accompanying such diffraction apparatus as previously mentioned the cassette is provided with a septum so that two patterns may be obtained at the same time. For this reason, one half the length of the capillary tube is packed with an unknown sample or specimen while the other half is packed with a substance whose fundamental lattice constant is known accurately, said substance being referred to in the art as a "standard".

The capillary tube is then placed in a slot located exactly at the center of the camera or cassette of definite radius, and is then exposed to a stream of X-rays for a requisite length of time. In the cassette used in conjunction with the structure of the Hull Patent No. 1,546,349 as above mentioned, about 1,200 milliampere-hours (that is, 48 hours at 25 milliamperes) of exposure are required to obtain a good pattern on the film. If the cassette or camera were placed closer to the source of X-rays, the time exposure would naturally be cut down somewhat.

There are, however, certain inherent limitations to the cassettes above mentioned and as used by the Hull structure, which prevents appreciable shortening of exposure. The thickness of the glass capillary tube is enough to cause a considerable amount of scattered radiation, which would ordinarily fog the film. In order to prevent this, a zirconium oxide filter is placed over the length of the exposed film, the said filter also serving to absorb the Beta rays. While such a filter cuts down fogging, it also cuts down the intensity of the diffracted lines. Moreover, the thickness of the glass capillary tube reduces the intensity of the primary X-rays as well as the diffracted rays. Therefore, those metals or alloys of higher densities (which consequently have to be more diluted with such substance as starch) will require considerably longer exposure. For example, in the case of lead, an exposure as long as 120 hours at 25 milliamperes is often necessary, and the films resulting are so fogged that they are useless for printing. It is a logical development of this condition that an attempt should be made to use intensifying screens, when the unknown specimen or sample is of a heavier metal. But on account of the very long exposure necessary and the consequent general fogging, the intensifying screen merely increases the general fogging and thus decreased the contrast of the films.

All the aforementioned limitations and shortcomings of the presently constructed cassettes, such as length of exposure and general fogging of the films could be overlooked if the results obtained were sufficiently accurate. Unfortunately, this is not so; the $\alpha_{1,2}$ doublets are practically all unresolved (unseparated) and the X-rays are hardly diffracted beyond 50 or 60 degrees within a reasonable length of exposure. And it is in the higher angles where the diffraction lines from the planes of high indices should be clear and accurate since these planes are important for the accurate determination of the fundamental lattice constant. In the accurate determination of such a constant, the use of the mean of the wave-lengths of $\alpha_1$ and $\alpha_2$, that is, 0.710 Angstrom units, is merely an approximation as the center of gravity of a doublet does not necessarily lie in the middle of an unresolved band doublet. For these reasons only an accuracy of 0.005 Angstrom units has been claimed and this automatically excludes the use of such apparatus as a precision instrument for research.

The improved and modified structure of your applicant in accordance with the invention herein and in accordance with the accompanying drawings overcomes the shortcomings inherent in the apparatus exemplified in Hull, U. S. Patent No. 1,546,349 above described. Thus, the $\alpha_{1,2}$ doublets are practically all resolved with the exception of one or two diffractions from planes of the lower indices, and the X-rays are diffracted throughout the 90° angle. For these reasons, the accuracy claimed in the improved and modified cassette structure of your applicant is of the order of 0.0002 Angstrom units, which is comparable to the highest precision instruments made in Europe.

The embodiment of the invention in its preferred form and adapted for the Hull U. S. Patent No. 1,546,349 structure will be described below.

10 and 11 represent the side walls of such cassette while 14, 15 and 16 represent transverse connecting members in spaced relation and situated at the free and front edges of the said side walls 10 and 11. 13 represents a shelf or baffle extending along the side walls 10 and 11 of the cassette and is directed downwardly and obliquely. Intermediate the width of the said shelf or baffle 13 is a septum 17 extending upwardly therefrom and dividing the enclosure formed by walls 10 and 11 into two compartments and thereby permitting two patterns to be taken as will hereinafter be described. 18 and 19 are two inwardly extending ribs in parallelism with shelf 13 and projecting from the inner surfaces of walls 10 and 11 respectively. The said ribs 18 and 19 in conjunction with shelf or baffle 13 afford a path for the receipt of X-rays emanating from a known slit structure hereinafter to be described.

20 and 21 represent reduced portions of the external surfaces of walls 10 and 11 respectively and extend to the edges 51 and 52 of the said walls between the aforementioned ribs and shelf or baffle 13.

29 is a curved covering for the curved outer edges of side walls 10 and 11 and is provided with downwardly extending flanges 29a and 29b respectively, the said covering 29 being substantially a quadrant of a circle in shape. Flanges 29a and 29b are provided with similar resilient spring members 30 which are adapted to register with notches 31 on the outer surfaces of the side walls 10 and 11, the said combination effectuating a latching means for the positioning and removal of covering 29 about the side walls 10 and 11 of the cassette.

At the inner surfaces of side walls 10 and 11 and beneath and in parallelism with the curved outer edges thereof are opposing inwardly extending ribs 34' and 34 to serve as a seating for a strip of film 36. The said strip of film is usually and preferably placed between a similarly dimensioned strip of aluminum plate 35 beneath and a similarly dimensioned strip of felt 37 above. 37' is a strip of spring material adapted to keep strips 35, 36 and 37 is close contact against the seating therefor furnished by ribs 34 and 34'. The outer end of spring strip 37' is provided with a screw projection 32 with which nut 33 engages, the said screw and nut serving as the locking means for spring strip 37' against transverse connecting member 16.

In conjunction with the quadrant cassette above described, there is provided the usual auxiliary apparatus such as a housing A in which is journalled an X-ray tube C, the aforementioned housing A being supported by the cover member of a second housing B containing the transformer and other incidental members not necessary to be described. The cylindrical walls A' of housing A are provided with slits and supports therefor radially arranged so that desired beams of X-rays can be directed at certain desired angles therefrom to act upon specimens in capillary 28, patterns of which are made on film 36.

The slits are usually made of superposed rectangular members 38 and 39 having centrally and longitudinally located therebetween a thin slit 40 expanding at its forward end into openings 42. 43 is an opening in cylindrical wall A' from which the beam of X-rays $m$ defined in thin slit 40 emanates to form a primary beam and diffracted rays $n$ and $o$ in the quadrant cassette. The slits, moreover, are held in angular position adjacent the inner surface of cylindrical wall A' at openings 43 by means of a block support, comprising upper member 44 and lower member 45, and member 46 serving as a friction element against easy sliding of the individual slit in its particular block support.

All matter hereinbefore mentioned is and has been known to those versed in the art of X-ray diffraction apparatus. The modification, substitution and addition of structure now to be described and affecting a type of quadrant cassette as just described constitutes the invention of the applicant herein.

The improved specimen receiving body comprises a block 55 preferably of lead and having an upper and curved surface with similar and aligned recesses 56 and 57 therein to house samples whose patterns are sought. The curved surface of block 55 terminates upwardly in edge 56'', the said edge 56'' being the upper extremity of superposing surface 56', the latter surface superposing the front edges 51 and 52 of the cassette as shown in Figure 3 of the accompanying drawings. Numeral 58 designates a specimen whose pattern is sought in powder form.

The specimen receiving body above described is provided with any clamping or affixing means but preferably a clamping member, the said clamping member being preferably substantially U in cross section. The clamping member has an outer wall 47, an inner and preferably lower wall 48 and a transverse connecting floor 46. 49 and 50 are set screws being preferably in alignment. The said set screws 49 and 50 are adapted to clamp the specimen receiving body or block 55 against the inner surface of wall 48 of the clamping member as best shown in Figure 3 of the accompanying drawings. Numerals 53 and 54 designate means such as screws, to affix the inner wall 48 of the clamping member to the cassette at the shelf or baffle 13 thereof.

Inner wall 48 of the clamping member is embedded in said shelf or baffle 13 so that surface 55' of specimen receiving body 55 will be in contact with edges 51 and 52 of the cassette as best shown in Figure 3 of the accompanying drawings. Such an arrangement affords adjustability of block 55 whereby the upper and outer edge 56'' thereof may coincide with the center of the quadrant cassette.

The new and improved baffle mechanism used in conjunction with and as part of the invention herein comprises a transverse member preferably affixed to the quadrant cassette at edges 51 and 52 near ribs 18 and 19, and is adapted to cooperate with the specimen receiving member or block 55. The said transverse member is provided with two similar end head members 60 and 61 respectively with the rear contacting faces thereof extending below the undersurfaces 60' and 61' of the respective end head members to form extensions or contacting abutments 62 and 63 for surface 56' of block 55. End head members 60 and 61 are joined together by connecting bar 64, the undersurface thereof 65 being disposed obliquely and downwardly to focus the X-rays toward the circular center of the cassette with the edge 56'' of the curved surface of block 55 coinciding therewith. The front edges 51 and 52 of the cassette are excavated at the junction thereof with end head member portions 60 and 61 so that the outer surface of extensions 62 and 63 are flush with the said front edges 51 and 52 of the cassette. 65' is the transverse bar affixed intermediate the length of the connecting bar 64 at the undersurface 65 thereof and having an outwardly extending forked projection 66 adapted to engage the thickness of septum 17 of the cassette. The baffle mechanism is affixed to the cassette by any means such as screw 68 penetrating each end head member 60 and 61 as best shown in Figure 3 of the accompanying drawings. The said baffle mechanism, as will hereinafter appear serves to cut off scattered radiation of the X-rays from the receiving block 55 below the specimen therein and also to make thin and sharper a broad band diffracted from planes of high indices.

69 represents any easily penetrable to X-ray material such as adhesive tape or paper designed to maintain in place the specimens in recesses 56 and 57 of the specimen receiving block 55. If powder is used as designated by numeral 58, the depth of the recesses is filled therewith so that the recess becomes co-planar with the curved surface of the block 55 and the outer edge 56'' is straight. If a metallic sheet or foil is used, the thickness of the same should bring about the same result. Where wire specimens are used, the outermost wire should be co-linear with the outer edge 56'' of either recess 56 or 57 and should have a diameter corresponding with the depth of the said recesses, while the remaining curved surface area of either recess is covered by parallel lengths of the said outermost wire.

Referring back to block 55, I wish it understood that solid specimens may assume the shape thereof and be fitted into the clamping member thereby avoiding a specimen receiving block altogether.

Figure 7 shows diagrammatically and in an exaggerated way incident X-rays upon a specimen having a comparatively flat surface. The representative rays $a$ and $b$ are diffracted from planes having the same indices, the corresponding diffracted rays $a'$ and $b'$ penetrating film 71 at a distance apart. Figure 8 shows diagrammatically the same situation using a specimen receiving block utilizing a curved surface focussing principle. Rays $c$ and $d$ are diffracted as rays $c'$ $d'$ from planes of the same indices and by virtue of the said curved surface focussing principle are brought closer together on film 72. As long as diffraction occurs in the planes of low indices, the diffraction lines will be narrow. But the diffraction lines from planes of the higher indices will be broadened due to geometrical conditions such as the area of the exposed or working curved surface of the specimen. The baffle mechanism allows enough diffraction to occur without appreciably broadening the diffraction lines.

The invention obviously does away with the overlapping or merging of diffraction lines from planes of low indices; a shorter exposure is necessary due to a greater exposed working surface of the specimen whose pattern is sought; the diffraction lines themselves are intensified and there is a greater resolution of the $\alpha_{1,2}$ doublet. Moreover, using the apparatus heretofore described and invoking the principle aforementioned, diffracted rays virtually throughout a 90 degree limit are registered on the film of the cassette, the lines in the higher angles coming from planes of high indices.

Utilizing the invention herein, and as has been before mentioned owing to a larger working area of the specimen exposed to the incident X-rays, a shorter exposure is effectuated. In addition the primary beams do not have to penetrate a capillary containing the specimen, but merely a thin easily penetrable adhesive material 69. As the fogging of the film is reduced by shorter exposure, the use of intensifying screens when a diffraction pattern of a very heavy metal is being obtained, is feasible and practical. Exposure of about 1000 milliampere-hours are sufficient to give good patterns, whereas in the known cassettes more than 3000 milliampere-hours exposure is required without resulting in diffraction from the planes of the higher indices.

By placing a small strip of aluminum or copper foil 59 on the superposing surface 56' of block 55 as shown in Figure 9 of the accompanying drawings, with the edge of the foil coinciding with the circular center of the cassette, faint but distinct diffraction lines from diffracted rays $e'$ will also be shown on the film 36. If the foil had previously been calibrated against pure sodium chloride as a primary standard, then two specimens in the block 55 could be studied at the same time with equal accuracy in measuring the fundamental lattice constant. Without the use of such foil, recesses 56 and 57 contain a known and unknown specimen, the fundamental lattice constant of the unknown being the one sought for.

It is of course always possible to mix the unknown powder with a known such as powdered sodium chloride to give the requisite standardization lines on the films. Aluminum and/or copper are preferred on account of convenience and because less confusion arises due to many diffraction lines being present.

Since no glass tubing or other capillary is employed in holding the specimen, the incident X-rays are intense enough to penetrate through the work surface layer of the crystals so that the diffraction lines become individually sharp instead of diffuse. The $\alpha_{1.2}$ doublets are therefore practically all resolved with the exception of a few lines from planes of large interplanar distance. Moreover, there is practically no limit to the size of the cassettes used in conjunction with the invention.

I wish it understood that minor changes in the structure, combination, cooperation, size and location of the several parts of the embodiment of the invention, and minor modifications in the accompanying known cassette structure may all be resorted to without departing from the spirit of the invention and without departing from the scope of the appended claims.

I claim:

1. In X-ray diffraction apparatus utilizing a substantially circular cassette for making diffraction patterns, a clamping member affixed transversely to the opening of the said cassette and below the circular center thereof, a specimen block adapted to be adjustably fixed in position by the said clamping member with the upper edge of the said specimen block coinciding with the circular center of the cassette.

2. In X-ray diffraction apparatus utilizing a substantially circular cassette for making diffraction patterns, a clamping member affixed transversely to the opening of the said cassette and below the circular center thereof, a specimen receiving block adapted to be adjustably fixed in position by the said clamping member, the specimen receiving block having recesses at the upper curved portion thereof such that the outer edges of the specimens coincide with the circular center of the cassette.

3. In X-ray diffraction apparatus utilizing a substantially circular cassette for making diffraction patterns and having a clamping member affixed transversely to the opening of the said cassette and below the circular center thereof, a specimen receiving block adapted to be adjustably fixed in position by the said clamping member, the said specimen receiving block having an upper curved surface provided with recesses along the said curved surface to the outer edge thereof, the said recesses when occupied by any specimens affording the said outer edges thereof to coincide with the circular center of the cassette.

4. In X-ray diffraction apparatus utilizing a substantially circular cassette for making diffraction patterns, a clamping member affixed transversely to the opening of the said cassette and below the circular center thereof, specimen blocks adapted to be adjustably fixed in position by the said clamping member with the upper edges of the said specimen blocks coinciding with the circular center of the cassette, and a baffle mechanism affixed transversely to the opening of the said cassette directing the X-rays to the upper edges of the said specimen blocks and preventing scattered and other diffracted rays from penetrating the film of the cassette.

5. In X-ray diffraction apparatus utilizing a substantially circular cassette for making diffraction patterns, a clamping member affixed transversely to the opening of said cassette and below the circular center thereof, a specimen receiving block adapted to be adjustably fixed in position by the said clamping member, the specimen receiving block having recesses at the upper curved edge thereof such that the specimens therein coincide with the circular center of the cassette, and a baffle mechanism affixed transversely to the opening of the said cassette directing the X-rays to the upper edge of the said specimen receiving block and preventing scattered and other diffracted rays from penetrating the film of the cassette.

6. In X-ray diffraction apparatus utilizing a substantially circular cassette for making diffraction patterns, a baffle mechanism affixed transversely to the opening of the said cassette above the circular center thereof, and comprising two similar end affixing members, a joining member therebetween the said joining member having an obliquely and downwardly disposed undersurface to focus the X-rays toward the circular center of the said cassette, the two similar end affixing members having rear and downward extensions against which the outer edge of the specimens coinciding with the circular center of the said cassette rests.

7. In X-ray diffraction apparatus utilizing a substantially circular cassette having a septum therein for making diffraction patterns, a baffle mechanism affixed transversely to the opening of the said cassette above the circular center thereof comprising two similar end affixing members, a joining member therebetween, the said joining member having an obliquely and downwardly disposed undersurface to focus the X-rays toward the circular center of the said cassette, a fork member intermediate the said undersurface of the joining member adapted to engage the septum of the cassette, the two similar end affixing members having rear and downward extensions against which the outer edge of the specimens coinciding with the circular center of the said cassette rests.

8. In X-ray diffraction apparatus utilizing a substantially circular cassette for making diffraction patterns and having a clamping member affixed transversely to the opening of the said cassette and below the circular center thereof, a specimen receiving block adapted to be adjustably fixed in position by the said clamping member, the said specimen receiving block having an upper curved surface provided with recesses along the said curved surface to the outer edge thereof, the said recesses when occupied by any specimens affording the said outer edges to coincide with the circular center of the cassette, and easily penetrable to X-ray adhesive material to maintain the position of the said specimens in the said recesses.

CHU-PHAY YAP.